United States Patent Office 3,238,188
Patented Mar. 1, 1966

3,238,188
NOVEL POLYPEPTIDES AND INTERMEDIATES FOR THE PREPARATION THEREOF
Roger Boissonnas, Bottmingen, Basel-Land, and Pierre-Alin Jaquenoud, Basel, Switzerland, assignors to Sandoz Ltd. (also known as Sandoz A.G.), Basel, Switzerland
No Drawing. Filed Jan. 24, 1963, Ser. No. 253,736
Claims priority, application Switzerland, Jan. 26, 1962, 990/62
5 Claims. (Cl. 260—112.5)

The present invention relates to polypeptides and their production.

The present invention provides a hitherto unknown polypeptide of Formula I, $$\text{NH}_2\text{-CH-CO-NH-CH-CO-NH-CH-CO-NH-CH-CO-NH-CH-CO-NH-CH-CO-N---CH--CO-NH-CH-CO-NH-CH}_2\text{-CONH}_2 \quad (I)$$

with side chains: $CH_2$-S-(bridge), $CH_2$-$C_6H_4OH$, $CH(CH_3)$-$CH_2$-$CH_3$, $CH_2$-$CONH_2$, $CH_2$-$CH_2$-$CONH_2$, $CH_2$-S-(bridge), $CH_2$-$CH_2$-$CH_2$ (proline ring to N), $CH_2$-$CH(CH_3)$-$CH_3$ (leucine)

The present invention also provides a process for the production of the Compound I, which comprises oxidising in aqueous solution the nonapeptide derivative of Formula V, $$\text{NH}_2\text{-CH-CO-NH-CH-CO-NH-CH-CO-NH-CH-CO-NH-CH-CO-N---CH-CO-NH-CH-CO-NH-CH}_2\text{-CONH}_2 \quad (V)$$

(with SH groups on cysteinyl residues)

The Compound V may be produced by reducing with alkali metal in liquid ammonia the nonapeptide derivative of Formula IV, $$\text{R}'\text{-NH-CH-CO-NH-CH-CO-NH-CH-CO-NH-CH-CO-NH-CH-CO-NH-CH-CO-N---CH-CO-NH-CH-CO-NH-CH}_2\text{-CONH}_2 \quad (IV)$$

(with S-R″ protecting groups)

in which
R′ denotes a radical known to be capable of protecting an amino radical of amino acids in peptide synthesis, and
R″ denotes a radical which is known to be capable of protecting a mercapto radical in peptide synthesis.

As used herein, the term "known" designates protective radicals in actual use in peptide synthesis or described in the literature on the subject. The Compound IV may be produced by condensing the hexapeptide derivatives of Formula II, $$\text{NH}_2\text{-CH-CO-NH-CH-CO-NH-CH-CO-N---CH-CO-NH-CH-CO-NH-CH}_2\text{-CONH}_2 \quad (II)$$

in which R″ is as defined above,
with a reactive derivative of a free acid, the free acid having the Formula III, $$\text{R}'\text{-NH-CH-CO-NH-CH-CO-NH-CH-CO}_2\text{H} \quad (III)$$

in which R′ and R″ are as defined above.

Examples of protective radicals for amino radicals in peptide synthesis are the carbobenzoxy-, the carbo-p-chloro-benzyloxy-, the p-toluenesulphonyl-, the triphenylmethyl-, the trifluoroactyl- or the phthalyl radical. Examples of protective groupings for the mercapto radical in peptide synthesis are phenyl-, benzyl-, p-bromobenzyl-, p-chlorobenzyl-, p-nitrobenzyl-, or p-xylyl radical; the benzyl radical is particularly advantageous for this purpose.

The Compound I has a contracting effect on the mammary gland which is almost equal to that of natural oxytocin; oxytocin has a formula similar to that of Compound I, except that it has an asparaginyl radical in the place of the glutaminyl radical. However, Compound I causes no noticeable increase in blood pressure or inhibition of diuresis. These surprising properties of Compound I are of great importance in the therapeutical field, especially in gynecology where breast-feeding troubles are experienced due to difficulties in evacuating the mammary gland, pains in feeding or pumping and in galactostases or incipient mastitis puerperalis. These properties of Compound I are especially remarkable, as in substituting iso-asparagine for asparagine, isoglutamine for glutamine, or glutamine for asparagine in the oxytocin molecule, substantially no uterus contracting action and no action on the mammary glands have hitherto been established.

The carrying out of the process in accordance with the invention is exemplified in the following:

N - carbobenzoxy - L - asparagine - p - nitrophenyl ester is condensed with L - asparaginyl - S - benzyl - L-cysteinyl - L - prolyl - L - leucyl - glycinamide to give N - carbobenzoxy - L - asparaginyl - L - asparaginyl - S-benzyl - L - cysteinyl - L - prolyl - L - leucyl - glycinamide. After splitting off the carbobenzoxy radical, the resulting L - asparaginyl - L - asparaginyl - S - benzyl - L-cysteinyl - L - prolyl - L - leucyl - glycinamide is condensed with N - p - toluenesulphonyl - S - benzyl - L-cysteinyl - L - tyrosyl - L - isoleucine - p - nitrophenyl ester to give N - p - toluenesulphonyl - S - benzyl - L-cysteinyl - L - tyrosyl - L - isoleucyl - L - asparaginyl - L-asparaginyl - S - benzyl - L - cysteinyl - L - prolyl - L-leucyl - glycinamide. This nonapeptide derivative is treated with an alkali metal, preferably sodium or potassium, in liquid ammonia, so that the linear nonapeptide V results. This is converted into the cyclic polypeptide I by oxidation in aqueous solution, preferably with oxygen or an oxygen containing gas (e.g. air), or hydrogen peroxide.

The polypeptide I may be employed as a pharmaceutical as such, or in the form of appropriate medicinal preparations for administration, e.g. enterally, parenterally or intranasally. In order to produce such medical preparations, the compounds of the invention are worked up with inorganic or organic adjuvants which are physiologically inert. Examples of such adjuvants or carriers for various medicinal preparations are as follows:

(1) Tablets and dragees—Lactose, starch, talc and stearic acid.
(2) Syrups—Solutions of cane sugar, invert sugar and glucose.
(3) Injectable solutions—Water, physiologically acceptable alcohols, glycerine and physiologically acceptable vegetable fats.
(4) Suppositories—Physiologically acceptable natural or hardened oils and waxes.

The preparations may contain suitable preserving, stabilizing or wetting agents, solubilizers, sweetening and colouring substances or flavourings, with the proviso that they must be physiologically acceptable in so far as these are for internal use.

The present invention thus provides pharmaceutical compositions containing, in addition to an inert carrier, the Compound I.

The present invention also includes Compounds II, IV and V above which are novel.

In the following non-limiting examples all temperatures are indicated in degrees centigrade.

EXAMPLE 1

(a) *N-carbobenzoxy-L-asparaginyl-L-asparaginyl-S-benzyl-L-cysteinyl-L-prolyl-L-leucyl-glycinamide*

29 g. of N-carbobenzoxy-L-asparaginyl-S-benzyl-L-cysteinyl-L-prolyl-L-leucyl-glycinamide are dissolved in 400 cc. of anhydrous acetic acid which is saturated with hydrogen bromide. The solution is left to stand for one hour at 20°, evaporated in a vacuum below 40°, the residue is carefully washed with diethyl ether and dissolved in 60 cc. of dimethylformamide after adding 5.6 cc. of triethylamine.

15.5 g. of N-carbobenzoxy-L-asparagine-p-nitrophenyl ester are immediately added to this solution. After 20 hours at 20°, a solid mass is obtained, which is brought into suspension with 500 cc. of ethyl acetate. The precipitate is filtered, washed with ethyl acetate and absolute ethanol and dried under vacuum. 28.4 g. of N-carbobenzoxy - L - asparaginyl - L - asparaginyl - S - benzyl - L - cysteinyl - L - prolyl - L - leucyl - glycinamide are obtained; M.P. 208°. $[\alpha]_D^{21} = -51°$ (c.=1 in dimethylformamide).

(b) *L-isoleucine-p-nitrophenyl ester hydrobromide*

50 g. of N-carbobenzoxy-L-isoleucine-p-nitrophenyl ester are dissolved in 250 cc. of anhydrous acetic acid which is saturated with hydrogen bromide. The solution is left to stand for one hour at 20°, evaporated in a vacuum below 40°, crystallized from diethylether, filtered and dried. 33.3 g. of L-isoleucine-p-nitrophenyl ester hydrobromide are obtained; M.P. 189°.

$$[\alpha]_D^{21} = +30°$$

(c.= 2 in water.

(c) *N-p-toluenesulfonyl-S-benzyl-L-cysteinyl-L-tyrosyl-L-isoleucine-p-nitrophenylester*

16 g. of dicyclohexylcarbodiimide are added at 0° to a solution of 52.9 g. of N-p-toluenesulphonyl-S-benzyl-L-cysteinyl-L-tyrosine and 33.3 g. of L-isoleucine-p-nitrophenyl ester hydrobromide in 750 cc. of acetonitrile and 11 cc. of triethylamine. The solution is stirred for four hours at 20°, the reaction mixture filtered and the filtrate then reduced in volume. The residue is dissolved in 1500 cc. of ethyl acetate and washed with dilute hydrochloric acid. The organic phase is dried with sodium sulphate, reduced in volume under vacuum and the residue recrystallized from hot absolute ethanol. 42.0 g. of N-p-toluenesulphonyl - S - benzyl - L - cysteinyl - L - tyrosyl-L-isoleucine-p-nitrophenyl ester are obtained; M.P. 168°. $[\alpha]_D^{21} = -36°$ (c.=2 in methanol).

(d) *N - p - toluenesulphonyl - S - benzyl - cysteinyl-L - tyrosyl - L - isoleucyl - L - asparaginyl - L - asparaginyl - S - benzyl - L - cysteinyl - L - prolyl - L - leucyl-glycinamide.*

17 g. of N-carbobenzoxy - L - asparaginyl - L - asparaginyl - S - benzyl - L - cysteinyl - L - prolyl - L - leucyl-glycinamide are dissolved in 300 cc. of anhydrous acetic acid which is saturated with hydrogen bromide. The solution is left to stand for one hour at 20° and evaporated in a vacuum below 40°. The residue is carefully washed with anhydrous diethylether and then added to a solution of 15 g. N-p-toluenesulphonyl-S-benzyl - L-cysteinyl - L - tyrosyl - L - isoleucine - p - nitrophenyl ester and 2.8 cc. of triethylamine in 60 cc. of dimethylformamide. It is left to stand overnight at 20° and the resultant solid mass suspended in 400 cc. ethyl acetate. The precipitate is filtered, washed with ethyl acetate and hot methanol and dried in a vacuum. 18 g. of N - p-toluenesulphonyl - S - benzyl - L - cysteinyl - L - tyrosyl-L - isoleucyl - L - asparaginyl - L - asparaginyl - S-benzyl-L - cysteinyl - L - prolyl - L - leucyl - glycinamide are obtained; M.P. 242°. $[\alpha]_D^{22} = -34°$ C. (c.=1 in dimethylformamide).

(e) *L - cysteinyl - L - tyrosyl - L isoleucyl - L - asparaginyl - L - asparaginyl - L - cysteinyl - prolyl - L-leucyl-glycinamide.*

Metallic sodium (potassium may be used as an alternative to sodium) is added while stirring at the boiling temperature to a solution of 5 g. of N-p-toluenesulphonyl-S - benzyl - L - cysteinyl - L - tyrosyl - L - isoleucyl - L-asparaginyl - L - asparaginyl - S - benzyl - L - cysteinyl-L-prolyl-L-leucyl-glycinamide in 1200 cc. of dry liquid ammonia in sufficient quantity to produce a stable blue colour. Ater adding 1 g. of ammonium chloride, the solution is evaporated to dryness. The residue contains the L - cysteinyl - L - tyrosyl - L - isoleucyl - L-asparaginyl-L - asparaginyl - L - cysteny - L - prolyl - L - leucyl-glycinamide.

(f) *Polypeptide Compound I*

The residue, which contains L - cysteinyl - L - tyrosyl-L - isoleucyl - L - asparaginyl - L - asparaginyl - L-cysteinyl - L - prolyl - L - leucyl - glycinamide, is dissolved in 5 litres of 0.01 N acetic acid and oxidized at a pH value of 6.5–8.0 by passage of air (pure oxygen can be used as an alternative to air) for one hour at 0–40°. The solution, which contains the substance I, is adjusted to a pH value of 4.0–5.0 and evaporated to dryness after adding 50 g. of sodium chloride, whereupon a dry powder is obtained which is relatively stable. It can be stored and be converted to a clear solution when used. It is also possible, however, to use the solution as such, if desired after dilution with water or a salt solution.

EXAMPLE 2

The procedure described in Example 1, Section (a) is followed. Then the procedure described in Section (d) is effected, but using an equivalent amount of N-p-toluenesulphonyl - S - benzyl - L - cysteinyl - L - tyrosyl-L - isoleucyl azide instead of N-p-toluenesulphonyl - S-benzyl - L - cysteinyl - L - tyrosyl - L - isoleucine - p-nitrophenyl ester. Further working up is effected as described in Sections (e) and (f).

EXAMPLE 3

The procedure described in Example 1, Section (a)

is followed. Then the procedure described in Section (d) is effected but using an equivalent amount of N-carbobenzoxy - S - benzyl - L - cysteinyl - L - tyrosyl-L-isoleucyl azide instead of N - p - toluenesulphonyl - S-benzyl - L - cysteinyl - L - tyrosyl - L - isoleucine-p-nitrophenyl ester. Further working up is effected as described in Sections (e) and (f).

EXAMPLE 4

The procedures of Examples 1, 2, and 3 are repeated in turn up to, but not including, the oxidation stage, but this time the oxidation is effected at 0–40° by adding 7.5 cc. of N aqueous solution of hydrogen peroxide at a pH value of 4.0 to 6.0 (instead of oxidation by passage of air or oxygen).

Having thus disclosed the invention what is claimed is:

1. A polypeptide of the formula

2. L -cysteinyl - L - tyrosyl - L - isoleucyl - L - asparaginyl - L - asparaginyl - L - cysteinyl - L - prolyl - L-leucyl-glycinamide.

3. N - p - toluenesulphonyl - S-benzyl-L-cysteinyl-L-tyrosyl - L - isoleucyl - L-asparaginyl-L-asparaginyl-S-benzyl - L - cysteinyl - L - prolyl-L-leucyl-glycinamide.

4. N-carbonbenzoxy - L - asparaginyl - L - asparaginyl-S-benzyl-L-cysteinyl-L-prolyl-L-leucyl-glycinamide.

5. A compound of the formula

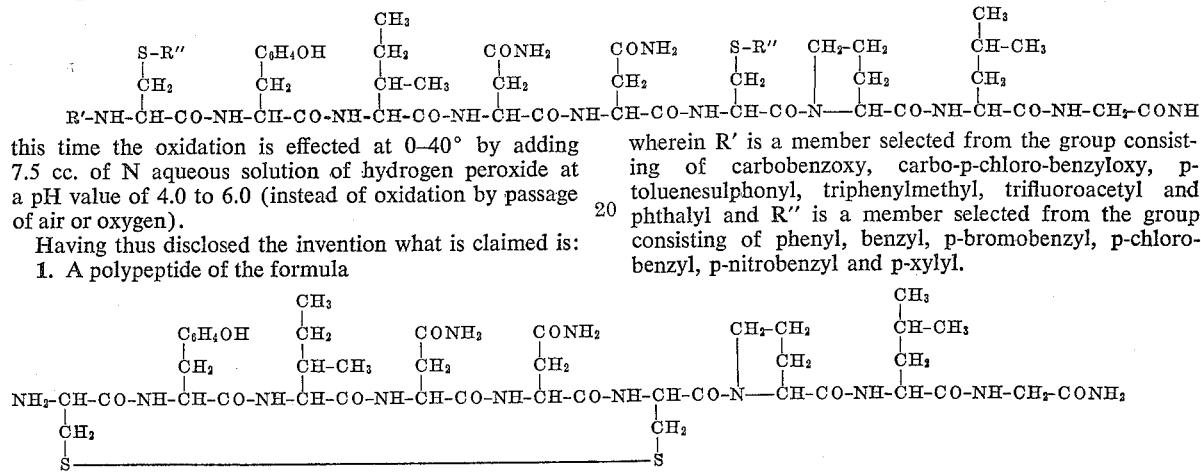

wherein R' is a member selected from the group consisting of carbobenzoxy, carbo-p-chloro-benzyloxy, p-toluenesulphonyl, triphenylmethyl, trifluoroacetyl and phthalyl and R" is a member selected from the group consisting of phenyl, benzyl, p-bromobenzyl, p-chlorobenzyl, p-nitrobenzyl and p-xylyl.

References Cited by the Examiner
UNITED STATES PATENTS

| | | | |
|---|---|---|---|
| 1,960,493 | 5/1934 | Kamm | 167—74 |
| 2,342,172 | 2/1944 | Dyke | 167—74 |
| 2,849,434 | 8/1958 | Eldridge | 260—112 |
| 3,095,408 | 6/1963 | Anderson | 260—112 |

LEWIS GOTTS, *Primary Examiner.*

FRANK CACCIAPAGLIA, Jr., *Examiner.*

SAM ROSEN, PERRY A. STITH, *Assistant Examiners.*